Patented June 24, 1941

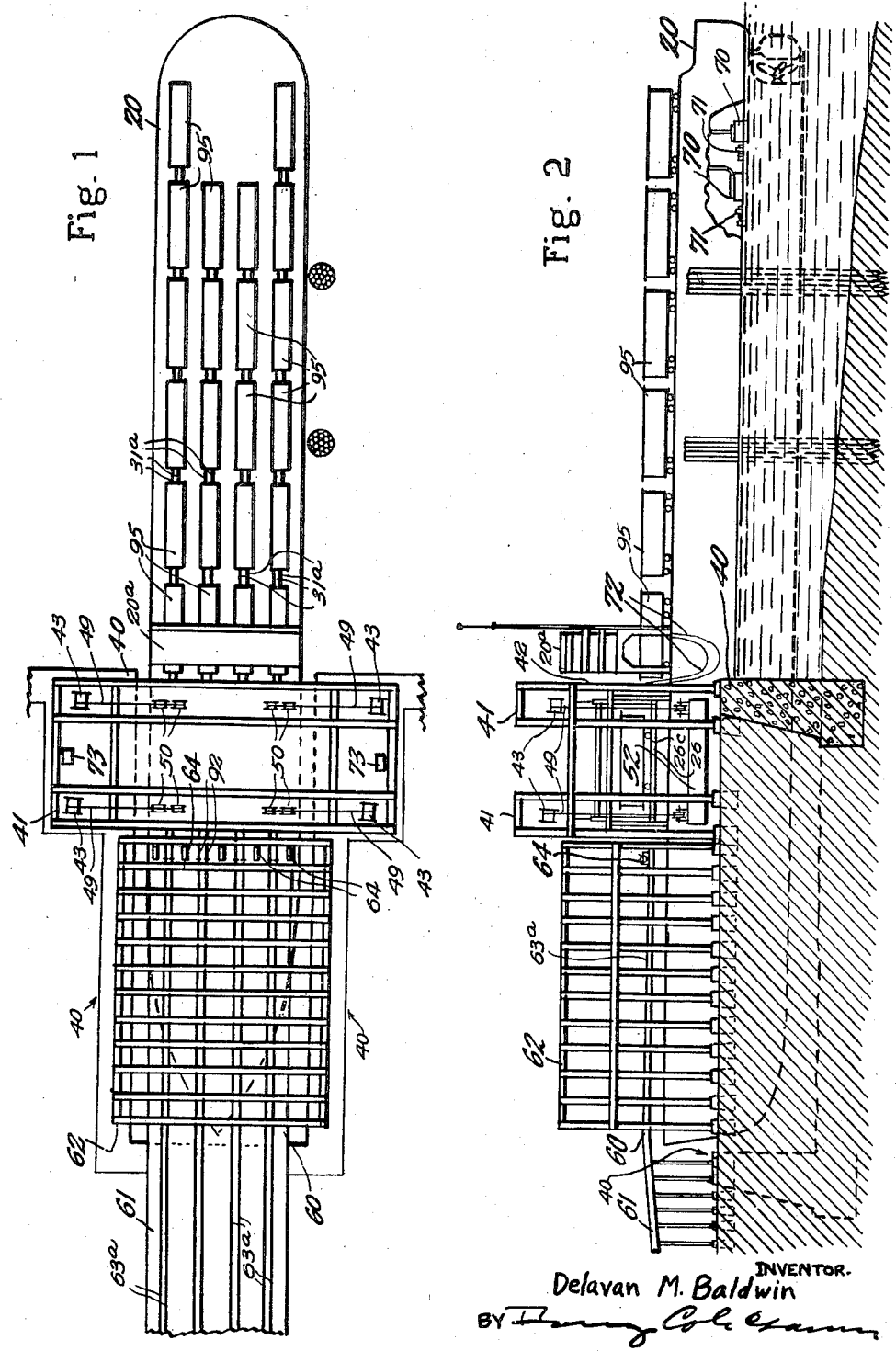

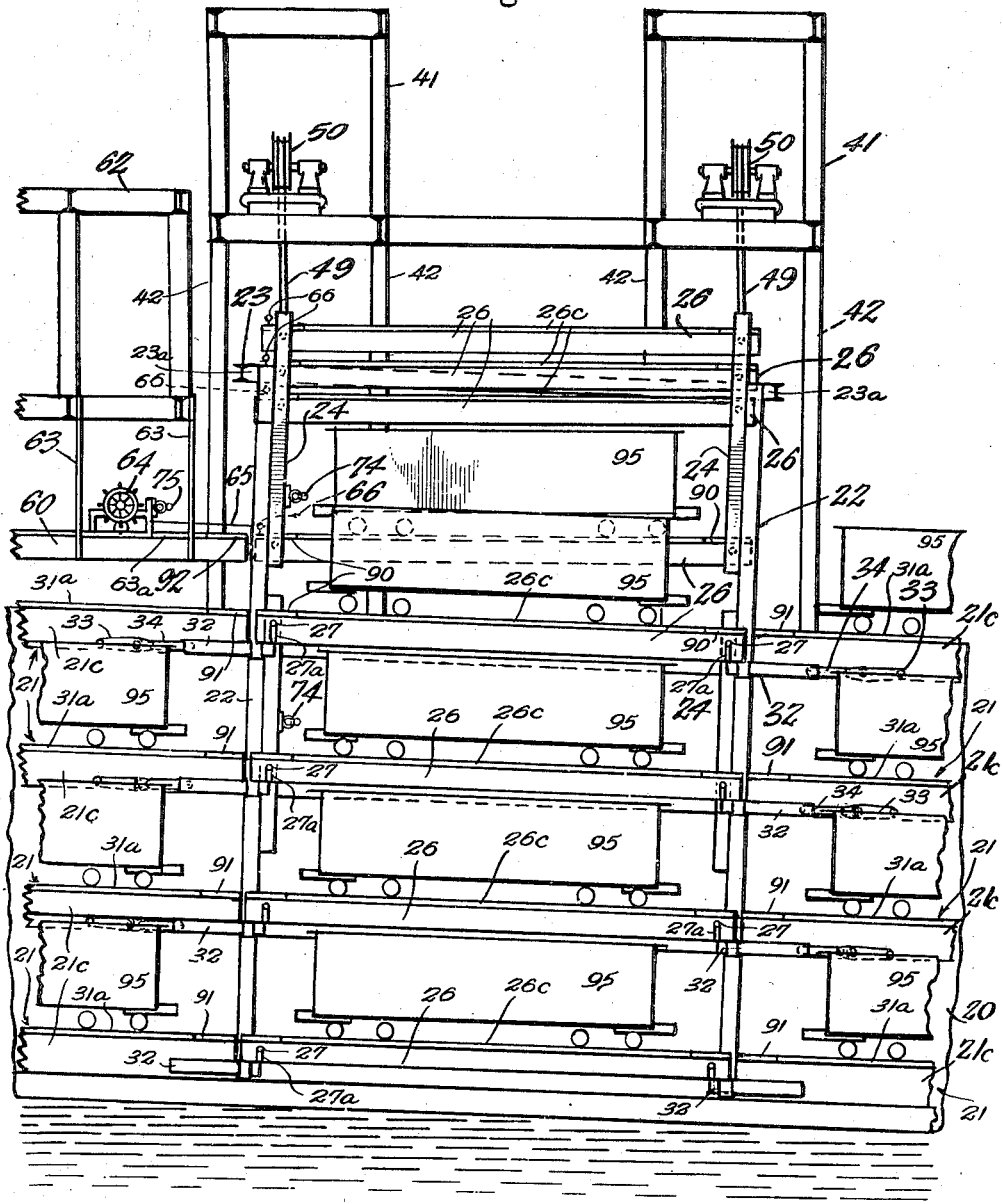

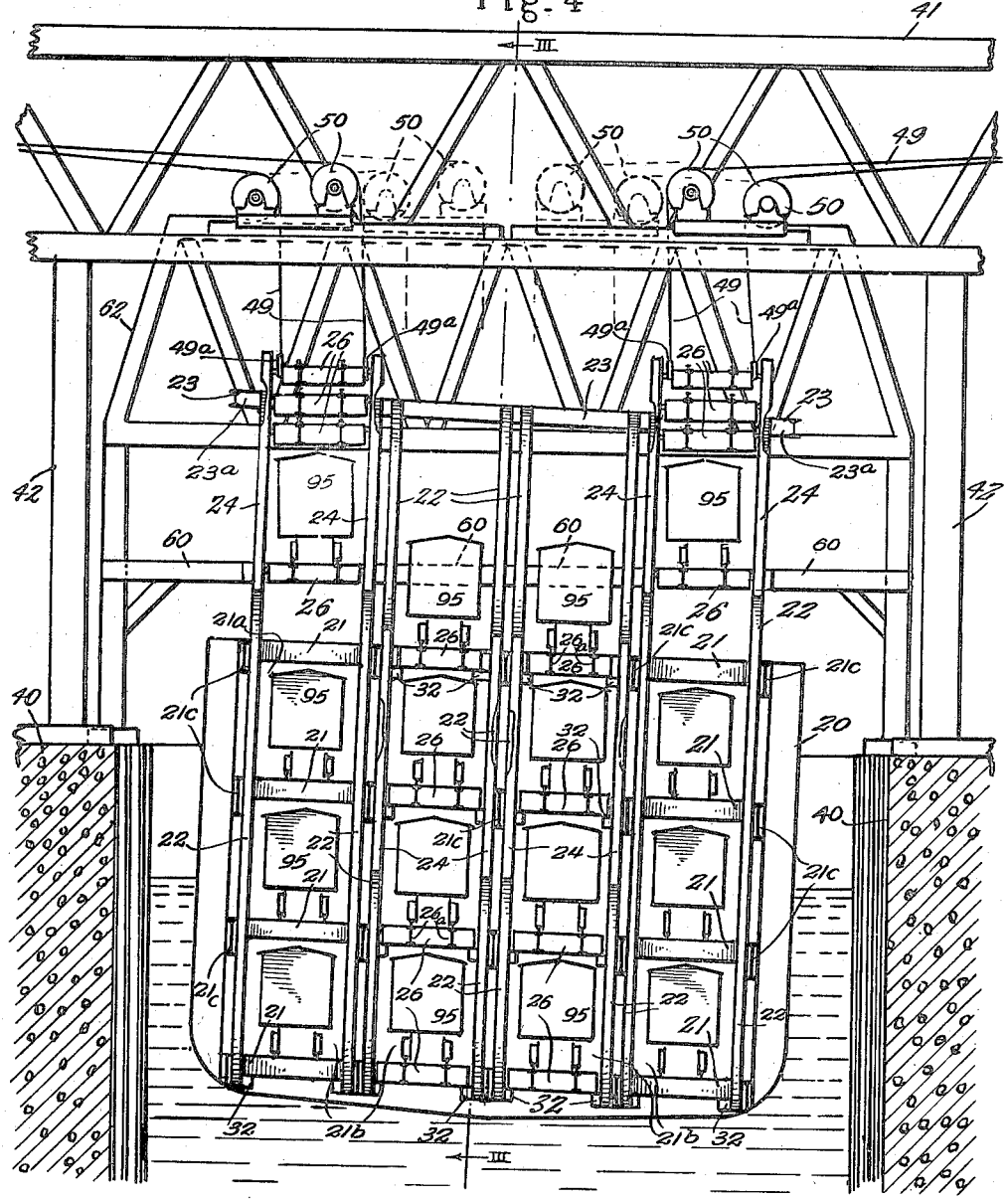

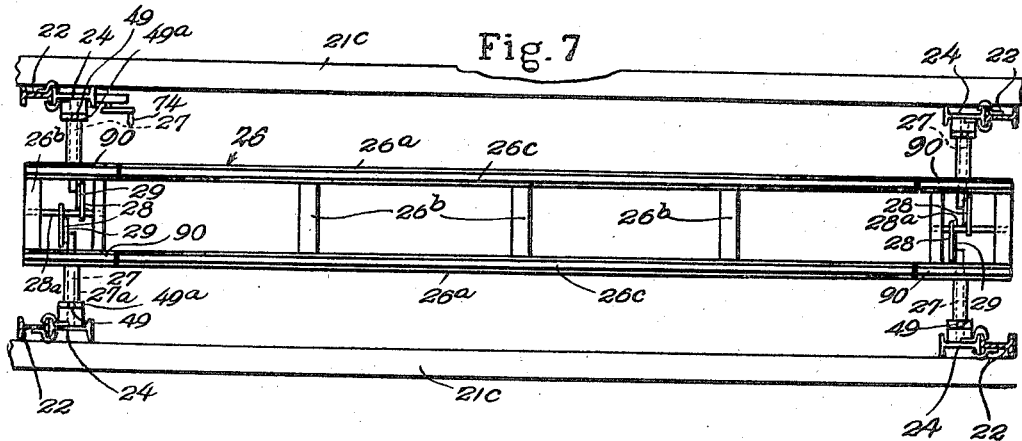
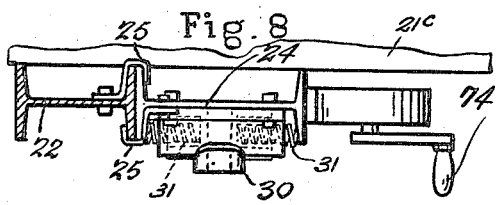
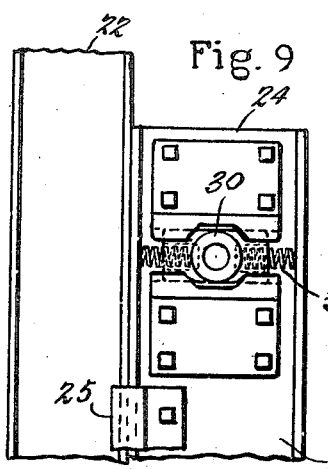
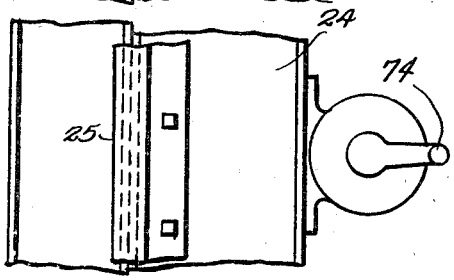
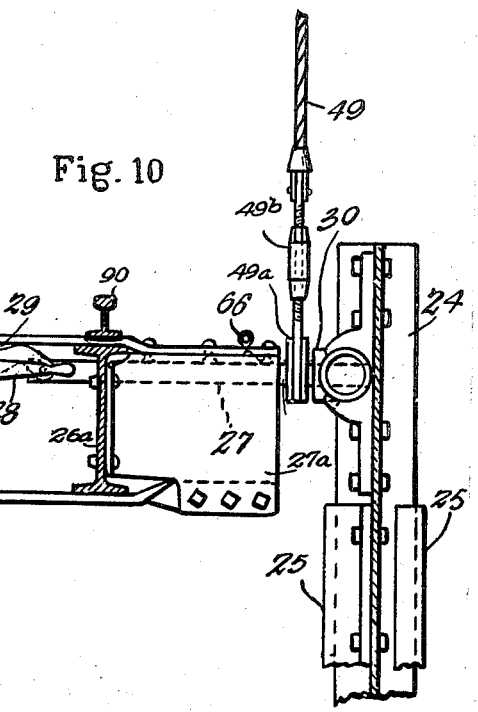

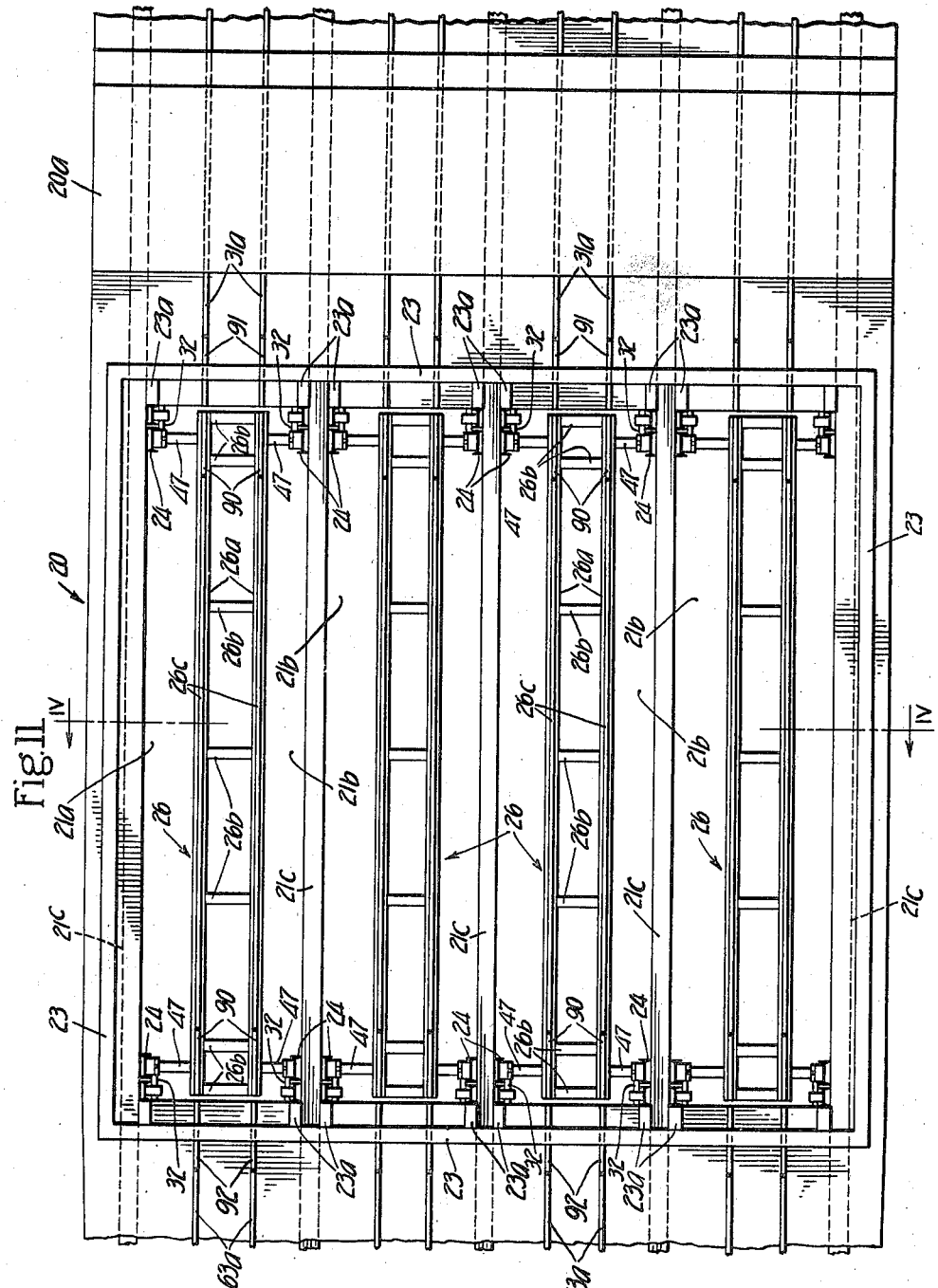

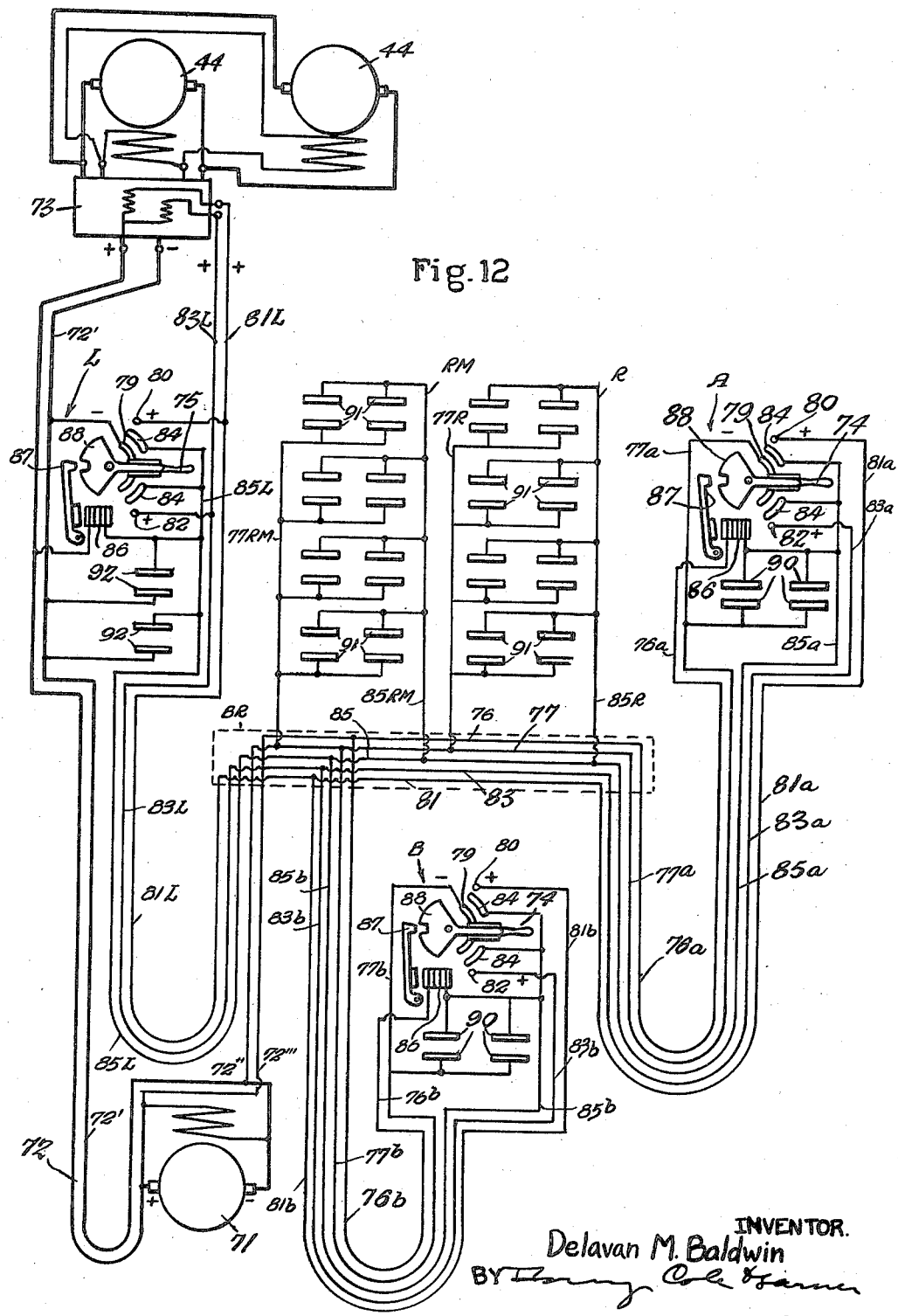

2,247,144

UNITED STATES PATENT OFFICE 2,247,144

VESSEL LOADING AND UNLOADING MECHANISM

Delavan Munson Baldwin, Campbell, Va.

Continuation of application Serial No. 252,616, January 24, 1939. This application April 4, 1941, Serial No. 386,906

14 Claims. (Cl. 214—14)

This invention relates to the transportation of vehicles in vessels equipped with elevators and adapted for the loading of vehicles from ports or railway terminals or yards, the storage of said vehicles and the unloading thereof at the point of destination. The word "vehicle" is employed herein in its broadest sense as an instrument of conveyance however supported for movement, as for example, on wheels, runners, casters, or independent rollers. Examples of vehicles for which the invention is particularly adapted are railway cars, trucks, tractors, trailers, airplanes, Army and Navy mechanized equipment, low flat cars primarily for use in the transportation of "containers" between docks, railway terminals or yards and the vessels hereof.

One object of this invention is to provide suitable vessels and docking facilities for the loading and unloading and marine transport of vehicles, such as above stated, with a minimum of power facilities. The vessels may be propelled by any suitable means, commonly employed. If desired such propulsion means may be of the electrical type in which the engines, usually oil-driven, are coupled to electric generators and the current used for the electric motors which drive the screw propellers and also for the hoisting mechanism of the elevators and other load-shifting means.

At each port where it is intended to load and unload, the docking facilities may conveniently take the form of a dock located between two wharves or piers for the berthing of the vessel. A hoisting bridge, preferably land-supported, is provided and so arranged as to overlie the elevators when the vessel is berthed in the dock. This carries the hoisting mechanism and counterweights, and from this the elevator cars will be suspended by cables detachably connected thereto. The hoisting drums, electric motors, counterweights and connections should be at the ends of the bridge where their weights serve as anchorages to strengthen the bridge. A landing platform also conveniently land-supported, likewise overlies the vessel, and the elevator cars when hoisted to a point even with the landing platform are moored thereto, and since the elevations of both are determined with respect to the land this relation will not be disturbed either by change of height of the vessel due to tidal variation or to change of load.

Further objects are to provide supplementary elevator platforms that can be supported independently of the hoisting mechanism for carrying vehicles in the hatchway.

Further objects are to provide elevator cars with platforms flexibly and yieldably connected to vertical slides by which they are guided so that the platforms can be brought into closer matching relationship either with the landing platform or with the vessel decks which may not be in parallel relation owing to listing of the vessel.

Further objects are to provide safety devices that will prevent operation of the elevators if vehicles are not properly positioned and overhang the edges of the hatchway.

Claims directed to the vessel structure in its adaptation to elevators carried thereby are reserved for my divisional application filed October 14, 1940, Serial No. 361,135. It is to be specifically understood that no abandonment of any of the claims not presented in this application or in the divisional application is to be incurred by the order in which Letters Patent thereon may issue, or by the fact that all of the claims are not presented in a single patent.

In the accompanying seven sheets of drawings which form a part of this application, Figure 1 is a plan view of a vessel together with a dock in which it is berthed, embodying this invention.

Fig. 2 is a side view of the same with one side of the dock in section.

Fig. 3 is a vertical longitudinal section through a portion of the vessel including one of the elevators, on the line III—III of Fig. 4.

Fig. 4 is a vertical transverse section through the vessel at the elevators on the line IV—IV of Fig. 11, including the hoisting bridge and landing platform.

Fig. 7 is an enlarged plan view of an elevator car shown on the deck level of an elevator shaftway.

Fig. 8 is an enlarged horizontal section of one corner of the shaftway showing an elevator guide and connected slide.

Fig. 9 is an elevation of a portion of the guide and slide.

Fig. 10 is a vertical transverse section through one half of an elevator platform together with its connection to a slide and hoisting cable.

Fig. 11 is a plan of a portion of the vessel including the elevators.

Fig. 12 is a diagram of the electrical circuits.

Figure 5:
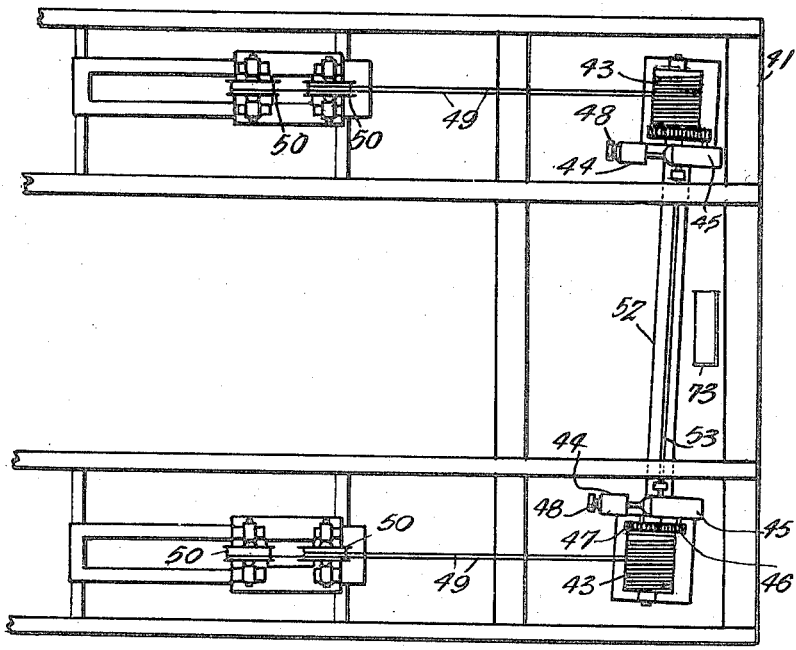
Fig. 5 is a plan of one half of the hoisting bridge showing the hoisting mechanism.

A vessel 20 having a suitably elevated pilot house 20a and being provided with the desired number of decks 21 (four being shown) is constructed with an elevator well 21a which extends through the decks and is divided into four shaftways 21b (see Fig. 11) by longitudinal girders 21c which run lengthwise through the vessel in line with and serving as a support for the decks. At each of the four corners of each shaftway there is mounted a guide 22 suitably attached to the decks and extending well above the top deck to a suitably supporting frame work 23 to which the guides are attached by supporting blocks 23a firmly affixed to the frame work 23.

Elevator cars travel in the shaftways. Each car comprises four slides 24, Figs. 3 and 7, illustrated as I-beams. Channels 25, Figs. 7, 8 and 9, lock the slides in slidable engagement to the guides. Four detachable platforms 26, Figs. 3 and 4, as many as there are decks, are provided. Each of these platforms comprises two supporting beams 26a extending lengthwise of the platform from end to end thereof suitably spaced apart and attached to one another by sufficient bracing illustrated as crossbeams 26b. Overlying and supported by the beams 26a are rails 26c spaced apart in accordance with the customary railway guage in vessels intended for the transportation of railway cars, as illustrated. The ends of these rails are insulated from the main portion as will later be set forth. For loading, these platforms are connected to the slides in each shaftway, one at the lower ends, and the others at the upper ends of the slides spaced from the lower platform sufficiently to afford head room for the vehicle that is to be carried, see Figs. 3 and 4. The connection is by round platform bolts 27 slidably mounted in bearing blocks 27a, Figs. 7 and 10, which are suitably attached to the beams 26a in well known manner. Each of these platform bolts is operated by a hand lever 28 through a toggle link 29. The hand levers are rotatably mounted on a shaft 28a suitably supported by the two end cross-members 26b as shown in Figs. 7 and 10.

The bolts lock into gimbal blocks 30 carried by the slides 24. These afford flexibility between the platforms and the slides with respect to two horizontal axes, so that a slight tilting of the platform will not cause the connections with the slides to bind. A short endwise movement at the gimbal blocks allows for inaccuracies in the alignment of the guides and permits the platforms yieldably to be drawn close to the edge of the shaftway when vehicles are to be moved on and off. Springs 31 center the blocks and the platforms so that they will clear the openings through the decks in passing therethrough.

The decks 21 are provided with rails 31a, laid in track form to correspond in spacing and location with the rails 26a on the elevator platforms 26 when brought to the deck level. As illustrated, therefore, there are four tracks on each deck at each end of the shaftways. These rails extend to the edges of the shaftways where their ends are insulated from their main portions as will later be set forth.

Deck bolts 32 under each deck, see Figs. 3 and 4, are projected into the shaftways for the elevator platforms to rest on and match the deck at which the load is to be transferred, the hoisting cables at the time being slackened. These deck bolts are illustrated at the four corners of each of the shaftways so as to provide a four-point support for the individual platforms which are employed in the raising, lowering and storage of the vehicles. The bolts are operated by levers 33 through toggle links 34.

The vessel is berthed in a dock 40, the walls of which partly surround the vessel and extend along the sides of the elevators which, in the form illustrated are located about midship. Land support is thereby afforded for a hoisting bridge 41 which is carried on towers 42 from the sides of the dock across the vessel over the elevators.

Figure 6:
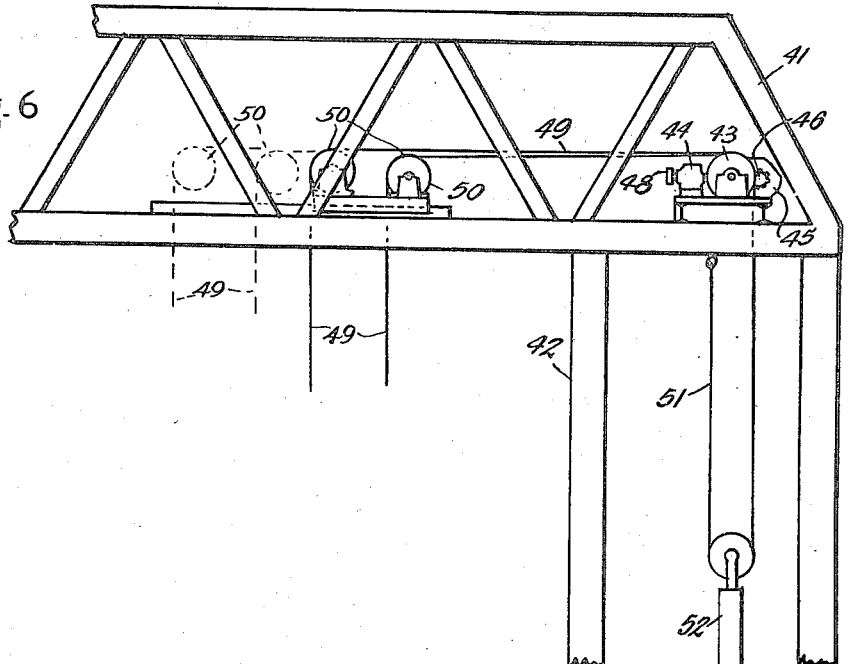
Fig. 6 is an elevation of one half of the hoisting bridge showing the hoisting mechanism.

Two hoisting drums 43, Figs. 1 and 2, are carried at each end of the bridge at the top of the tower and are driven by electric motors 44, Figs. 5 and 6, through suitable gear reduction 45, 46, and 47. A magnetic brake drum 48 is carried on each motor shaft. The two hoisting drums at each end of the bridge are connected with a shaft 53 and their speed of rotation thereby synchronized.

Two hoisting cables 49 are attached to each hoisting drum. A pair of sheaves 50 carried by the bridge are mounted in line with each of the hoisting drums 43. The sheaves of each pair are conveniently spaced apart approximately a distance equal to the width of an elevator. Each pair of sheaves is shiftable from a position over an outer shaftway to a position over an adjoining inner shaftway, see Fig. 6. The hoisting cables from each drum lead over the pair of sheaves in line therewith, one over each shaftway. The hoisting cables have at their free ends rings 49a for engagement with the platform bolts 27, as illustrated for example in Fig. 10 and schematically shown in Fig. 4. A turn buckle 49b is provided in each of the hoisting cables so that the elevator loading platforms may be levelled off with the landing platform. The hoisting drums 43 are placed at a slight angle to the sheaves 50 (see Fig. 5) to compensate for the spiral winding of the hoisting cables 49 on the drums and permit the hoisting cables to run freely to the sheaves.

Counterweight cables 51 are attached to each hoisting drum 43 at one end and at the other to the bridge. The counterweight cables at each end of the bridge lead to and carry a common counterweight 52 in the well known manner.

Supporting the hoisting apparatus and counter-weights at the extreme ends of the hoisting bridge imparts to it the stress properties of a continuous girder and permits it to be of lighter structure.

A landing platform 60, Figs. 1, 2 and 3, extends over the vessel to the elevators and is land-supported at the end of the dock where it joins a ramp 61 over which vehicles are delivered to and from the platform. If it has to extend a considerable distance to the elevators, it is also necessary to provide land support from the sides of the dock. Sufficient clearance is required between the under side of the landing platform and the top deck of the vessel to allow for variations in tide and load. The thickness of the landing platform needs to be kept down as much as possible to allow for clearance below and head room above without unduly extending the elevator shaftways above the top deck of the vessel. Support of the landing platform from the sides of the dock is illustrated as provided by a bridge 62, at a sufficient height for head room above the landing platform, and suspension bars 63, Fig. 3, which connect the landing platform to the bridge 62.

The landing platform 60 and ramp 61 are provided with rails 63a laid in track form to correspond in spacing and location with the rails 26a on the elevator platforms 26 being loaded or unloaded. As illustrated, therefore, four of these tracks are provided. The rails 63a extend to the outer edge of the landing platform where their ends are insulated from their main portions as will later be set forth.

Mooring means of conventional form between the landing platform and the elevator platforms are provided which comprise windlasses 64, ropes 65, and eyes 66 on the elevator platforms for the ropes, by means of which the edges of the landing platform and elevator platforms employed in loading and unloading are made to match and the landing platform rails 63a are made to register with the rails 26a of the said elevator platforms at their respective ends.

These mooring means, it should be understood, are in addition to the ordinary means (not shown) by which the vessel is berthed in the dock. Difference in tide and load on the vessel result in variations in the height of the landing platform 60 above the top deck of the vessel. To compensate for the variations, the elevator must be moved to various positions in its guides 22 above the top deck so that its loading platform 26 will be opposite the landing platform 60. When this has been effected, the elevator loading platform 26 is brought into and held in exact registration with the landing platform 60, as above set forth, by means of the mooring gear 64, 65, 66. After the vehicle to be loaded has been moved from the landing platform 60 on to the elevator loading platform 26, or conversely when the vehicle to be unloaded has been moved from the elevator loading platform to the landing platform, the mooring ropes 65 are released from their eyes 66 so that the elevator may be lowered from the landing platform for vehicle transportation.

As illustrated in Fig. 1, five windlasses 64 are provided, one on each side of the landing platform tracks 63a, those between the several tracks to be employed for double use so that the elevator loading platforms 26 may be held for loading and unloading to the landing platform 60 by two windlasses.

The motors 44 for the hoisting drums 43 (Figs. 5 and 6) are to be supplied with current from any suitable source. As illustrated, the supply is taken from the generators 71 on the vessel which are driven by engines 70 (Fig. 2) and which supply power for the propulsion of the vessel and other purposes.

Control apparatus for the hoisting drums is preferably provided so that the elevators may be controlled from the elevator loading platforms 26 and also from the landing platform 60. As illustrated (Fig. 7), the control apparatus for the elevators, indicated by the control handle or switch 74, is mounted at one end of each elevator on one of the elevator slides 24 at a convenient distance above the lower end of the slide for operation from the elevator platform 26 which is attached to the bottom of the slides for loading and unloading. Obviously this could be duplicated at the other end of the elevator if desired.

If the first or top elevator platform 26 is to be used in loading and unloading from its position at the top of the slides (as will later be pointed out) instead of being lowered to a position at the bottom of the slides, the elevator will preferably be controlled from the control apparatus on the landing platform 60 indicated by the control handle or switch 75 (Fig. 3), although as is well understood in the art, means may be provided at the top of the elevator for its control from the first or top platform.

Safety means are provided for preventing interference with elevator operation under the control of one control switch by accidental or intentional movement of another control switch.

Safety means are provided to prevent operation of the elevator while being loaded and unloaded. It has been above pointed out that the ends of the elevator rails 26c, the ends of the deck rails 31a, and the ends of the landing platform rails 63a are all insulated from the main portions of these respective rails. These insulated end sections are embodied in the said last named safety means. They are respectively rail sections 90 at each end of the platform rails 26a, sections 91 at the shaftway ends of the deck rails 31a (Figs. 7 and 11), and sections 92 at the outer end of the landing platform rails 63a (Figs. 1 and 3).

In Fig. 12 is illustrated a wiring diagram of various circuits and control apparatus which may conveniently be employed in the hoisting, lowering, and control of elevators for the two shaftways in which the elevators are moved by a single pair of hoisting drums 43 as illustrated more particularly in Figs. 4 and 5, for example, the outer right hand shaftway and middle right hand shaftway in Fig. 4. These circuits and control apparatus may be duplicated in whole or in part for the hoisting mechanism for the other two shaftways.

Reference now being had more particularly to Fig. 12, the motors 44 (Fig. 5) for the hoisting drums 43 on the hoisting bridge 62 (which it will be remembered is mounted on the dock 40) for the outer right hand and middle right hand shaftways are to be connected by suitable switches, not shown, with the generators 71 (Fig. 2) on the vessel by flexible conductors 72 to the positive side and 72' to the negative side of the generators. These flexible conductors 72, 72' are connected with the motors 44 through control mechanism 73 which may be of any type suitable for elevator motor control, a simple form, for example, being shown in U. S. Letters Patent No. 783,174.

This control mechanism 73 is actuated for hoisting, lowering, and stopping of the elevators of the two said shaftways through flexible conductors 81L and 83L from the vessel which are connected with the control mechanism by suitable switches not shown. Both of these conductors are connected in the control mechanism 73 with the positive side of the generator 71, as set forth in the said Letters Patent.

These flexible conductors 81L and 83L are connected respectively to conductors 81 and 83 of a bus bar BR conveniently mounted on the vessel, which bus bar embodies also conductor 76 suitably connected with the positive side of the generator by a branch flexible conductor 72''' leading to the power line 72, conductor 77 suitably connected with the negative side of the generator by a branch flexible conductor 72'' leading to the power lines 72' and safety conductor 85 later to be more fully referred to.

The control apparatus on the elevators and on the landing platform 60 are identical in structure. The control apparatus for the elevator in the outer right hand shaftway of Fig. 4 is indicated at A in Fig. 12; the control apparatus for the elevator of the middle right hand shaftway of Fig. 4 is indicated at B; and the control apparatus on the landing platform 60 for both of these elevators is indicated at L.

Each of said control apparatus comprises a switch 74 in apparatus A and B, and 75 in apparatus L, suitably mounted for partial rotation and shown in normal open circuit position; a curved contact 79 extending on both sides of the switch 74 in normal position of the switch, with which the switch has sweeping electrical contact in both directions of swing to the limit of said swing; control contacts 80 and 82, one on each side of the switch when in normal position and engageable by the switch at the respective limits of its swing; curved safety contacts 84, one on each side of the normal position of the switch, normally out of contact therewith but so mounted as to be engaged by the switch prior to engagement of the switch with the control contacts 80 and 82, said engagement being continued to the limit of the swing of the switch; a normally deenergized locking magnet 86; a suitably mounted toothed armature 87 for the locking magnet 86; and a sector 88 rigidly connected with the switch 74, having a centrally located notch opposite the tooth of the armature 87 when the switch is in normal position, the armature 87 being normally held out of contact with the sector and its notch and being brought into contact therewith on energization of the magnet 86.

The three contacts 79 are connected in parallel with the negative side of the generator as follows: Contact 79 of control apparatus A through flexible conductor 77a to conductor 77 of the bus bar BR; contact 79 of control apparatus B through flexible conductor 77b to conductor 77 of the bus bar BR; and contact 79 of control apparatus L by a short lead direct to the power line 72'.

The three control contacts 80 are in parallel and are connected with the control conductor 81L and the positive side of the generator as follows: Contact 80 of control apparatus A through flexible conductor 81a to conductor 81 of the bus bar BR; contact 80 of control apparatus B through flexible conductor 81b to conductor 81 of the bus bar BR; and contact 80 of control apparatus L by a short lead direct to control conductor 81L.

The three control contacts 82 are in parallel and are connected to control conductor 83L and the positive side of the generator as follows: Contact 82 of control apparatus A through flexible conductor 83a to conductor 83 of the bus bar BR; contact 82 of control apparatus B through flexible conductor 83b to conductor 83 of the bus bar BR; and conductor 82 of control apparatus L by a short lead direct to control conductor 83L.

The two safety contacts 84 of each control apparatus are in themselves in parallel and each pair are in turn in parallel, being connected with the contact 85 of the bus bar BR as follows: The pair of contacts 84 of control apparatus A through flexible conductor 85a; the pair of contacts 84 of control apparatus B through flexible conductor 85b; the pair of conductors 84 of control apparatus L through flexible conductor 85L. The connection of the safety contacts 84 just traced may be broadly termed the safety circuit of the control apparatus.

The coils of the three locking magnets 86 are in parallel. At one end these coils are connected to the positive side of the generator and on the other with the safety circuit. These connections are as follows: The coil of the magnet 86 for control apparatus A is connected at one end to the positive side of the generator through flexible conductor 76a to conductor 76 of the bus bar BR, and at the other end to the safety circuit by a short lead to the flexible conductor 85a; the coil of the magnet 86 of control apparatus B is connected at one end to the positive side of the generator through flexible conductor 76b to conductor 76 of the bus bar BR, and at the other end to the safety circuit by a short lead to the flexible conductor 85b; the coil of the magnet 86 of control apparatus L is connected at one end to the positive side of the generator by a short lead direct to the power line 72', and at the other end to the safety circuit by a short lead direct to flexible conductor 85L.

Associated with the illustration of each of the three control apparatus A, B, and L, are the insulated rail sections 90 in apparatus A and B and 92 in apparatus L. A discussion of the connections of these insulated rail sections with the control apparatus and their relation thereto will follow a brief explanation of the operation of the control apparatus above described.

Let it be assumed that the control contacts 80, which are connected with the control conductor 81L, govern the supply of current for actuating the control mechanism 73 to hoist the elevators, and that the control contacts 82, which are connected with the control conductor 83L, govern the supply of current for actuating the control mechanism 73 to lower the elevators.

Consider first the elevator in the outer right hand shaftway of Fig. 4 where the sheaves 50 are in position above this shaftway for hoisting and lowering. The fourth or bottom platform 26 of the elevator is there illustrated as on a level with the landing platform 60. The switch 74 of the control apparatus A and 75 of the control apparatus L are in normal open circuit position (Fig. 12), the control conductors 81L and 83L are dead and the elevator is held stationary.

To lower the elevator in controlling its movement from the elevator platform, the switch 74 of the control apparatus A is rotated clockwise until it contacts with the control contact 82 and closes the circuit of the control conductor 83L at that point. When the elevator has reached its desired lower position, the said control switch 74 is moved back to normal open circuit position, the circuit of the control conductor 23L is broken and the downward movement of the elevator stopped.

To hoist the elevator from its lowered position in continuing its control from the elevator platform, the switch 74 of control apparatus A is rotated counterclockwise until it contacts with the control contact 80 and closes the circuit of the control conductor 81L at that point. When the elevator has reached its desired upper position the said control switch 74 is moved back to normal open circuit position, the circuit of the control conductor 81L is broken, and the upper movement of the elevator is stopped.

The same procedure for lowering, hoisting, and stopping the elevator would be followed respecting the switch 75 of the control apparatus L when it is desired to control the elevator from the landing platform 60. Furthermore, as will be apparent from the following, the control of the elevator from any stopped position with the control switches 74, 75 in normal open circuit position, may be shifted from the control apparatus L to the control apparatus A, and vice versa.

Referring now to the safety contacts 84 in the control apparatus A on the elevator, it will be observed that when the switch 74 is moved to connect the control contact 82 with contact 79 for closing the circuit of the control conductor 83L, prior to so doing the switch connects the lower safety contact 84 with contact 79. This closes the circuit of the coil of the control magnet 86 in control apparatus A, energizes that magnet and causes the tooth of armature 87 to move into contact with the sector 88. But this sector has been moved so that its notch does not register with the tooth of the armature 87 and that tooth has merely an inoperative sliding contact with the edge of the sector itself and does not interfere with the operation of the said switch 74. When that switch is moved back to normal open circuit position the circuit of the said coil is broken at the lower contact 84 and the armature 87 moved to its normal position out of contact with the sector 88.

The sequence of operations just described obviously characterizes the movement of the switch 74 of control apparatus A in closing and opening the circuit of the conductor 81L at control contact 80.

This sequence of operation has an immediate effect on control apparatus L on the landing platform 60. As the coil of the magnet 86 in the control apparatus L is in parallel with the coil 86 of the magnet in the control apparatus A, the coil of the magnet 86 in the control apparatus L is energized at the same instant as the coil in control apparatus A. Consequently, the tooth on the armature 87 in the control apparatus L is moved into engagement with the notch in the sector 88 of the control switch 75 so that the switch 75 is locked and interference by the control apparatus L on the landing platform 60 with the control apparatus A on the elevator in lowering, and hoisting the elevator is prevented. This locking of the switch 75 in control apparatus L persists until the switch 74 in control apparatus A has been moved out of contact with whichever of the safety contacts 84 it has closed and the magnet 86 in control apparatus A is deenergized.

The sequence of operations in locking and unlocking the switch 75 of the control apparatus L when the control of the elevator is from the control apparatus A, would obviously characterize the locking and unlocking of the switch 74 of control apparatus A when the control of the elevator is from control apparatus L.

The procedure and operation above set forth will be followed for hoisting, lowering, and stopping the elevator in the middle right hand shaftway wherein the control apparatus B and L will be employed. In this connection, as heretofore explained, the hoisting cables 49 will be transferred from the elevator of the outer right hand shaftway to that of the middle right hand shaftway and the sheaves 50 moved to proper position above the last named shaftway, as shown in dotted lines in Fig. 4.

It has been pointed out that control apparatus A and B both control the operation of the hoisting drums 43 (Figs. 5 and 6) which hoist and lower the elevator of both of these shaftways. Consequently, if the switch 74 of control apparatus A is not removed or locked when the change over of the hoisting cables 49 and sheaves 50 from the outer right hand shaftway to the middle right hand shaftway is made, control apparatus A as well as control apparatus B may be employed for control of the operation of the elevator in the middle right hand shaftway. The converse is true where the hoisting cables 49 and sheaves 50 are moved from the middle right hand shaftway to the outer right hand shaftway.

No interference in control results from this possible dual control of the elevators in the two shaftways, as the coils of the magnets 86 in control apparatus A and B are in parallel. When control apparatus A is employed, control apparatus B is automatically locked in precisely the same way as above explained respecting control apparatus A and L. In like manner when control apparatus B is employed, control apparatus A is locked.

The safety means hereinabove referred to for preventing operation of the elevator while being loaded and unloaded comprise the insulated ends of the rails of the tracks on the elevator platforms, decks, and landing platform 60 which are connected into the safety circuit above described. The rails of each of these tracks at their shaftway ends are insulated from each other a distance back from the shaftway at least equal to the overhang of the vehicles to be carried by the vessel beyond their wheel ends, so that if a vehicle extends over the edge of the shaftway, the wheels will effect closure of the safety circuit at the insulated rail ends with resultant energization of the locking magnets 86 in control apparatus A, B, and L (Fig. 12).

As specifically illustrated, both rails of each track have their ends insulated from the rest of the tracks, said ends being herein referred to as insulated rail sections. Furthermore, the vehicles to be carried are illustrated as railway freight cars 95 having steel wheels and axles so that when their wheels contact the insulated rail sections, the circuit at the insulated rail sections is completed directly through the wheels and axles without the provision of additional closing means which would otherwise be provided as is readily understood.

The insulated rail sections 90 (Figs. 7 and 11) of the four platforms 26 of the elevator for the outer right hand shaftway (Fig. 4) are schematically illustrated in Fig. 12 at the bottom of control apparatus A, wherein a pair of insulated rail sections 90 at each end of a single elevator platform are shown. The insulated rail sections 90 of the four platforms 26 of the elevator for the middle right hand shaftway (Fig. 4) are similarly illustrated at the bottom of control apparatus B.

The insulated rail sections 91 (Fig. 11) on the four decks in line with the outer right hand shaftway (Fig. 4), one pair at each end of the shaftway, are illustrated in diagram R. The insulated rail sections 91 on the four decks opposite the middle right hand shaftway (Fig. 4) are similarly illustrated in diagram RM.

The insulated rail sections 92 on the landing platform 60 (Figs. 1 and 3) for the outer and middle right hand shaftways (Fig. 4), are illustrated at the bottom of control apparatus L. The insulated rail sections 92 for both of these tracks are directly connected with the single control apparatus L because, as above explained, that apparatus by the shifting of the sheaves 50 controls the movement of the elevator for both of the said shaftways.

The connection of the insulated rail sections 90 of the elevator of the outer right hand shaftway (Fig. 4) with the control apparatus A is such that when any one of its four platforms 26 are in position for loading and unloading, the insulated rail sections of that platform are electrically connected into the circuits of the control apparatus as follows: The insulated rail sections 90 at the outer ends of one rail are connected in parallel to the flexible conductor 77a and thence to the negative side of the generator as heretofore traced. The insulated rail sections 90 at the outer ends of the other rail are connected in parallel to the coil of the locking magnet 86 and to the safety conductor 85a. The connection of the said coil with the positive side of the generator has been heretofore traced.

The connection of the insulated rail sections 90 of the elevator of the middle right hand shaftway (Fig. 4) with the control apparatus B are similar to those of the elevator of the outer right hand shaftway and clearly shown in Fig. 12, and reference is made to the immediately preceding description without repetition thereof.

The connections of the insulated rail sections 91 on the four decks in line with the outer right hand shaftway (diagram R) are as follows: The insulated rail sections 91 on one side of each track are connected in parallel to a common conductor 77R which leads to conductor 77 of the bus bar BR connected with the negative side of the generator as heretofore traced. The insulated rail sections 91 on the other side of each track are connected in parallel to a common conductor 85R which leads to safety conductor 85 of the bus bar BR connected with the positive side of the generator through the coils of the locking magnets 86 of control apparatus A, B, and L as heretofore traced.

The connection of the insulated rail sections 91 on the four decks in line with the middle right hand shaftway are similar to those of the four decks in line with the outer right hand shaftway as clearly shown in diagram RM, and reference is made to the immediately preceding description without repetition thereof.

Conductors 77RM and 85RM in diagram RM correspond respectively with conductors 77R and 85R in diagram R. These conductors to the bus bar BR are separately shown for the insulated rail sections 91 of the deck rails in line with the middle and outer right hand shaftways respectively, for ready understanding. To those skilled in the art it will be apparent that the insulated rail sections of the corresponding deck rails for both shaftways could if desired be connected to the bus bar BR on the one side by a single lead to the conductor 77 and on the other side by a single lead to conductor 85.

The connection of the insulated rail sections 92 of the two said tracks on the landing platform 60 with the control apparatus L are as follows: The insulated rail sections 92 on the one side of the two tracks are connected in parallel to the negative power line 72'. The insulated rail sections on the other side of the two tracks are connected in parallel to the coil of the locking magnet 86 and to the safety conductor 85L. The connection of the said coil with the positive side of the generator has been heretofore traced.

From the foregoing it is seen that all of the insulated rail sections 90, 91, and 92 on one side of the various tracks are connected in parallel to the negative side of the generator and all of the said insulated rail sections on the other side of the tracks are connected in parallel to the safety circuit and the coils of the locking magnets 86 of the control apparatus A, B, and L, and thence to the positive side of the generator. Hence when any single pair of insulated rail sections is bridged by a vehicle extending into either the outer or middle right hand shaftway (Fig. 4), the locking magnets 86 of the three control apparatus are all energized and their respective toothed armatures 87 moved into engagement with their cooperating switch sectors 88.

If these switch sectors 88 are in normal open circuit position, all of the switches are locked, and hoisting and lowering of the elevator in the shaftway in which the elevator is connected with the hoisting cables 49 (Fig. 4) is prevented. This condition obtains until the vehicle bridging the insulated rail sections is moved back away from the shaftway in which it extends and the bridged insulated rail sections are open circuited.

If, however, one of the switches 74, 75 is being employed in the hoisting or lowering of an elevator and the notch in its sector 88 is out of alignment with the tooth of its cooperating armature 87, that particular switch is not locked until moved to normal open circuit position and the elevator being hoisted or lowered brought to a stop. To this extent control of the elevator being moved is thus left to the operator.

The switches of the two control apparatus not being employed in hoisting or lowering the elevator, already locked by the switch being used as above explained, are not released when the operator moves his switch to open circuit position to stop the elevator. These switches together with the switch moved to normal open circuit position by the operator remain locked and elevator operation is prevented until the bridged insulated rail sections are open circuited.

It has heretofore been stated that the control apparatus of Fig. 12 is to be duplicated in whole or in part for the other two shaftways, assumed for ready description, to be the outer and middle left hand shaftways in Fig. 4. When it is desired to load and unload the two said pairs of shaftways independently, i. e., without interference in control, the control apparatus of Fig. 12 should be duplicated in its entirety for the outer and middle left hand shaftways. This includes not only the control apparatus A, B, and L, but also the control mechanism 73, the bus bar BR, and the circuit arrangement.

The generator or generators 71 may of course be common to both systems, and the power lines 72, 72' may be carried to the landing platform 60 to serve for both systems and branch power lines led therefrom beyond the connecting switch heretofore referred to for the control apparatus L and mechanism 73 of the system not directly connected with the power lines 72, 72'.

*Operation*

In the operation of loading, storing and unloading vehicles it is desirable that the load be so handled as to keep the boat so far as possible on an even keel and with a fairly uniform load fore and aft. To this end it is preferable in transferring the vehicles to and from the vessel and dock to employ either the two outer elevators or the two inner elevators simultaneously, and to load or unload one deck at a time. Furthermore, where the facilities permit, when a vessel is to be unloaded and loaded at the same dock, after one deck has been unloaded it is desirable to reload that deck with the vehicles to be transported so that the height of the vessel above the water may be maintained fairly uniform.

These recommendations, obvious in themselves, go primarily to efficient transfer of the vehicles from the elevators to the landing platform and from the landing platform to the elevators, for they tend to maintenance of a fixed positional relationship between the landing platform and the vessel. It should be borne in mind, however, that the gimbal blocks 30 and platform bolts 27 provide for a marked listing of the vessel and for uneven loading fore and aft. The listing of the vessel is illustrated in Figs. 3 and 4.

Where a vessel is empty it is convenient to load the bottom deck first. This, however, is not necessary and the order of deck loading may be as desired and as indicated by the weight carried in the vehicles themselves, the heaviest vehicles, of course, being preferably loaded on the lower decks of the vessel.

More particularly the operation of loading, storing, and unloading may be most conveniently understood by reference to Fig. 4, and with the foregoing general principles in mind attention is now directed to that figure. In describing the operation reference to mooring the loading elevator platform to the landing platform will be omitted for simplification of description, this having been fully set forth above.

In Fig. 4 the vessel is shown as moored to the dock 40 (Figs. 1 and 2) with the numerous flexible conductors (not shown in Fig. 4) which lead from the vessel to the hoisting mechanism and the control apparatus therefor located on the landing platform 60, connected to the hoisting mechanism and the said control apparatus as described above in connection with Fig. 12.

The hoisting cables 49 by their rings 49a have been connected through the elevator platform bolts 27 to the first or top elevator platforms 26 of the two outer elevators, the sheaves 50 having been previously moved to proper position above the two outer elevator shafts respectively. The lengths of the four hoisting cables 49 for each of the outer elevators have been adjusted by the turn buckles 49b (see Fig. 10) so that the fourth or bottom platform of each of the two outer elevators is on a level with the landing platform 60.

The figure illustrates completed loading of the four decks of the vessel on the trackways in line with the middle shaftways and the storage of vehicles (illustrated as freight cars 95) on elevator platforms 26 in the middle shaftways. The three lower decks on the trackways opposite the two outer shaftways are shown as completely loaded. Vehicles have been moved from the landing platform 60 to the fourth or bottom platforms 26 of the two outer elevators for storage on and complete loading of the top deck of the vessel.

It is believed that from the foregoing the loading of the decks themselves of the vessel will be understood without further detailed description, the elevators as illustrated at the top of the outer shaftways being employed for this purpose and the loading being accomplished from the fourth or bottom platform of the elevators with the three upper platforms carried by the slides to which they are attached by their respective platform bolts 27 and gimbal blocks 30.

The storage of vehicles in the shaftways themselves may be understood from a consideration of the right hand inner and outer shaftways, without repetition as to the left hand inner and outer shaftways where the operation is identical with that now to be described.

For storage of cars in the right hand shaftway, the right hand elevator with a vehicle moved thereon as shown in Fig. 4 is lowered to a position slightly above the bottom deck. The deck bolts 32 of the bottom deck if not already in the shaftway are then projected to their inward positions and the elevator further lowered until its fourth or bottom platform carrying the vehicle rests on the deck bolts 32 in line with the lower deck with its rails in registration with the rails of the lower deck. The hoisting cables 49 are thereupon slightly lowered to relieve them from strain. The platform bolts 27 of the fourth or bottom platform are then withdrawn from their respective gimbal blocks 30 on the slides 24 (see Fig. 10), and that platform with its vehicle thereon is in storage position as indicated at the bottom deck in the right hand middle shaftway.

After the bottom platform and its vehicle are thus in storage position the elevator slides 24 with the three upper platforms 26 still attached at the top thereof, are raised by the hoisting cables 49 until the third platform 26 is slightly above any one of the three remaining decks selected. Whereupon the deck bolts 32 of that deck are projected inwardly into the shaftway and the elevator slides 24 are then lowered until the third platform rests on the said deck bolts 32. The platform bolts 27 of the third platform 26 are then withdrawn from their respective gimbal blocks 30 and the elevator slides 24 with the two upper platforms still attached at the top, are raised until their bottom gimbal blocks 30 are opposite the platform bolts 27 of the third platform. Whereupon the said platform bolts are projected into their respective gimbal blocks and the elevator is in readiness to be raised to the landing platform 60 to receive the vehicle for storage in the shaftway opposite the third deck. The said deck bolts 32, unless those of the third deck are employed as above, are then withdrawn.

With the vehicle moved from the landing platform 60 to the third platform 26 now attached to the bottom of the slides 24, the elevator with its vehicle is then lowered to a position slightly above the third deck, and the third deck bolts 32, unless already in the shaftway, are projected beneath the said platform which is then detached from the slides 24 and left for storage with its vehicle on the third deck as above described respecting the bottom deck. The slides are thereupon raised, the second elevator platform 26 detached from its position at the top of the slides and attached to the bottom of the slides as previously described. Whereupon the elevator thus arranged is raised for loading from the landing platform 60 as above set forth.

This procedure is repeated as to the second elevator platform for storage of that platform and its vehicle opposite the second deck.

For the top deck there remains attached to the elevator slides 24 only the first or top platform 26. This platform is loaded in its top position from the landing platform 60; and lowered to a position slightly above the top deck as in the previous instances. The top deck bolts 32 are thereupon projected beneath the platform and the platform is lowered to rest thereon. The platform bolts 27 are then temporarily withdrawn, preferably one by one, from their respective gimbal blocks 30 and the hoisting rings 49a lifted out of engagement with the platform bolts, the slides 24 being temporarily supported in a suitable manner during this operation. As soon as one of the hoisting rings 49a has been moved out of engagement with its respective platform bolt 27, the latter is moved outwardly into engagement with its gimbal block. The slides 24, therefore, remain attached to the first platform at their top ends in the storage position of the first platform, as indicated in the right hand middle shaftway.

When all of the decks and the shaftways have received their full quota of storage load, the hoisting cables 49 are raised above the top of the shaftways so as to permit the sailing of the ship without any interference therefrom. The numerous flexible conductors for the hoisting mechanism and its control apparatus on the landing platform 60, above referred to, are disconnected therefrom. The mooring ropes 65 are withdrawn from their eyes 66 on the vessel and the vessel fully loaded is ready for sailing from its dock.

In unloading the vessel it is convenient first to unload the cars stored in the shaftway as illustrated in the right hand middle shaftway of Fig. 4. When this plan is followed, after the berthing of the vessel in the dock the numerous flexible conductors, above referred to, which lead from the vessel to the hoisting mechanism and control apparatus therefor located on the landing platform 60, are connected to the hoisting mechanism and the said control apparatus as described above in connection with Fig. 12. The sheaves 50 are moved to proper position over the shaftway to be unloaded (in this instance the right hand middle shaftway). The bolts 27 of the top elevator platform 26 are withdrawn one by one from their respective gimbal blocks 30 on the slides 24, inserted through the hoisting cable rings 49a and moved back into their respective gimbal blocks, the slides being suitably supported in any convenient way during this operation. The deck bolts 32 of the top deck are then withdrawn so as to leave the shaftway clear at the top deck.

The elevator with its first or top platform 26 thus connected is raised to the landing platform 60, and the hoisting cables 49a are adjusted by the turn buckles 49b to place the elevator platform level with the landing platform. Whereupon the vehicle on the elevator platform is moved to the landing platform 60.

The elevator is then lowered until the gimbal blocks 30 at the bottom of the slides 24 are opposite the platform bolts 27 of the elevator platform 26 which is in line with the second deck. The platform bolts 27 of that platform are then moved into engagement with their respective gimbal blocks 30 and the deck bolts 32 withdrawn out of the shaftway. The elevator is then raised for discharge of the vehicle on the second platform in the same manner as respecting the first or top platform.

The procedure respecting the elevator platform opposite the second deck is followed for the third and fourth or bottom decks, it being optional whether or not the deck bolts 32 of the bottom deck are withdrawn or left in holding position.

After all of the shaftways have been unloaded, as above described, it will be observed that the elevator has its four platforms mounted thereon and is connected to the hoisting mechanism by the platform bolts 27 of the first or top platform, as shown above the outer right hand shaftway. With the elevator so arranged the four decks themselves can be unloaded and reloaded in the preferred order above recommended. After the decks have been reloaded, the loading of the shaftways proceeds as above described.

Numerous variations in the loading and unloading of the decks with the equipment above specifically described are obviously possible. For example, it may be desirable to unload and reload the top deck immediately after the first or top elevator platforms on which vehicles are stored have been unloaded, prior to unloading the elevator platforms employed for storage in the shaftways opposite the second, third, and bottom decks. If this procedure is followed, the top deck is loaded and unloaded from the first or top platforms of the elevators without carrying the three other platforms thereon. In like manner the second deck may be unloaded and reloaded from the second platforms of the elevators without carrying the two lower elevator platforms thereon. This procedure may be followed as to the third deck. The choice of numerous ways of loading and unloading, as above indicated, will be governed largely by convenience and the overhead occasioned by the weight of the elevator platforms unnecessarily attached to the elevators.

This application is a continuation of my application Ser. No. 252,616, filed January 24, 1939.

The foregoing detailed description has been given for clearness of understanding and no undue limitation should be inferred therefrom.

I claim:

1. A vessel with sets of elevator guides, elevator cars running between the guides, in combination with a dock in which the vessel is berthed, a wholly land-supported hoisting bridge carried on towers on the two sides of the dock, hoisting mechanism with winding drums supported at the ends of the bridge, counterweights, cables attached to the drums from which the counterweights are suspended, sheaves on the bridge over the elevators, and cables attached to the drums and leading over the sheaves and depending therefrom and detachably connected to the elevators.

2. In an arrangement for loading and unloading vessels including a dock having a hoisting bridge, and a vessel berthed in the dock beneath the hoisting bridge, the vessel comprising a plurality of decks and a shaftway connecting the decks, the combination of elevator guides carried in the shaftway by the vessel; an elevator embodying a platform and running between the guides for delivering vehicles to and from the decks of the vessel; hoisting mechanism for the elevator carried by the hoisting bridge over the vessel shaftway; and a landing platform supported from the dock and extending over the vessel to the elevator so located that the elevator platform can be brought to meet the edge of the landing platform for the direct transfer of vehicles between the landing platform and the elevator platform, while the elevator is suspended by its hoisting mechanism.

3. In an arrangement for loading and unloading vessels including a dock having a hoisting bridge, and a vessel berthed in the dock beneath the hoisting bridge, the vessel comprising a plurality of decks and a shaftway connecting the decks, the combination of elevator guides carried in the shaftway by the vessel; an elevator embodying a platform and running between the guides for delivering vehicles to and from the decks of the vessel; hoisting mechanism for the elevator carried by the hoisting bridge over the vessel shaftway; a landing platform supported from the dock and extending over the vessel to the elevator so located that the elevator platform can be brought to meet the edge of the landing platform for the direct transfer of ve- hicles between the landing platform and the elevator platform, while the elevator is suspended by its hoisting mechanism, and means for mooring the elevator platform to the landing platform.

4. In an arrangement for loading and unloading vessels including a dock having a hoisting bridge, and a vessel berthed in the dock beneath the hoisting bridge, the vessel comprising a plurality of decks and being provided with a plurality of shaftways connecting the decks, the combination of elevator guides carried in each shaftway by the vessel; an elevator for each shaftway embodying a platform and running between the guides of its respective shaftway, for delivering vehicles to and from the decks of the vessel; hoisting mechanism for the elevators carried by the hoisting bridge over the vessel shaftways and comprising winding drums, sheaves shiftable to operative positions over the individual elevators, and cables leading from the drums over the sheaves and depending therefrom for detachable connection to any single elevator.

5. In an arrangement for loading and unloading vessels including a dock having a hoisting bridge, and a vessel berthed in the dock beneath the hoisting bridge, the vessel comprising a plurality of decks and a shaftway connecting the decks, the combination of elevator guides carried in the shaftway by the vessel; an elevator embodying a platform; slides running on the guides and being flexibly and yieldably connected to the elevator so that the elevator platform may be brought to meet the edges of the decks for delivering vehicles to and from the decks; hoisting mechanism for the elevator carried by the hoisting bridge over the vessel shaftway; and a landing platform supported from the dock and extending over the vessel to the elevator so located that the elevator platform can be brought to meet the edge of the landing platform for the direct transfer of vehicles between the landing platform and the elevator platform, while the elevator is suspended by its hoisting mechanism.

6. In an arrangement for loading and unloading vessels including a dock, and a vessel berthed in the dock and comprising a plurality of decks and a shaftway connecting the decks; the combination of an elevator operating in the shaftway and embodying a platform for delivering vehicles to and from the decks of the vessel; a track for the vehicles on the elevator platform comprising rails, the ends of which at each end of the platform are insulated from each other; tracks for the vehicles on the decks in line with the track on the elevator platform and comprising rails, the rails of each of the deck tracks having their ends adjoining the shaftway insulated from each other; a landing platform supported from the dock and extending over the vessel to the shaftway; a track on the landing platform in line with the track on the elevator platform and comprising rails the ends of which adjoining the shaftway are insulated from each other; an electric safety circuit connected with the insulated rail ends of the said tracks; and means operable by the safety circuit to prevent operation of the elevator when the adjacent insulated rail ends of any one of said tracks are electrically bridged.

7. In an arrangement for loading and unloading vessels including a dock, and a vessel berthed in the dock and comprising a plurality of decks and a shaftway connecting the decks, the combination of an elevator operating in the shaftway and embodying a platform for delivering vehicles to and from the decks of the vessel; a track for the vehicles on the elevator platform having insulated rail sections adjoining the ends of the platform; tracks for the vehicles on the decks in line with the track on the elevator platform and having insulated rail sections adjoining the shaftway; a landing platform supported from the dock and extending over the vessel to the shaftway; a track on the landing platform in line with the track on the elevator and having insulated rail sections on the end of the platform adjoining the shaftway; an electric safety circuit connected to the insulated rail sections of each track, and means operable by the safety circuit to prevent operation of the elevator when any pair of insulated rail sections are electrically bridged.

8. In an arrangement for loading and unloading vessels including a dock having a landing platform, and a vessel berthed in the dock in loading and unloading position respecting the landing platform, the vessel comprising a plurality of decks and being provided with a plurality of shaftways connecting the decks, the combination of elevator guides carried in each shaftway by the vessel; an elevator for each shaftway embodying a platform and running between the guides of its respective shaftway, for delivering vehicles to and from the decks of the vessel; hoisting mechanism for the elevators above the shaftways comprising a hoisting drum, a hoisting cable wound thereon, and a sheave over which the hoisting cable runs, the sheave being shiftable to operative position over each shaftway and the hoisting drum being fixed relative to the shiftable sheave; means for disconnecting the hoisting cable from the elevator in one shaftway and for connecting it to the elevator in another shaftway; apparatus on each elevator for controlling the hoisting mechanism, the parts being so constructed and arranged that the elevators in the said shaftways may be hoisted to and lowered from loading and unloading position respecting the landing platform by the single hoisting mechanism under individual control of the control apparatus on the elevator to which the hoisting cable is connected.

9. In an arrangement for loading and unloading vessels including a dock having a landing platform, and a vessel berthed in the dock in loading and unloading position respecting the landing platform, the vessel comprising a plurality of decks and being provided with a plurality of shaftways connecting the decks, the combination of elevator guides carried in each shaftway by the vessel; an elevator for each shaftway embodying a platform and running between the guides of its respective shaftway, for delivering vehicles to and from the decks of the vessel; hoisting mechanism for the elevators above the shaftways comprising a hoisting drum, a hoisting cable wound thereon, and a sheave over which the hoisting cable runs, the sheave being shiftable to operative position over each shaftway; means for disconnecting the hoisting cable from the elevator in one shaftway and for connecting it to the elevator in another shaftway; apparatus on each elevator for controlling the hoisting mechanism, and an interlocking safety circuit, the parts being so constructed and arranged that the elevators in the said shaftways may be hoisted to and lowered from loading and unloading position respecting the landing platform by the single hoisting mechanism under individual control of the control apparatus on the elevator to which the hoisting cable is connected without interference by the other control apparatus.

10. Apparatus as in claim 9 in which the apparatus for controlling the hoisting mechanism on each elevator embodies a handle, a coil in the safety circuit, and an armature associated therewith actuated on movement of the handle in one control apparatus to prevent movement of the handle in another control apparatus.

11. Apparatus as in claim 9 in which apparatus for controlling the hoisting mechanism is mounted on the landing platform and interconnected with the control apparatus and safety circuit on the elevators.

12. Apparatus as in claim 9 in which apparatus for controlling the hoisting mechanism is mounted on the landing platform and interconnected with the control apparatus and safety circuit on the elevators and in which each specified control apparatus embodies a handle, a coil in the safety circuit, and an armature associated therewith actuated on operative movement of the handle in one control apparatus to prevent operative movement of the handle in the other control apparatus.

13. In an arrangement for loading and unloading vessels including a dock, and a vessel berthed in the dock and comprising a plurality of decks and a shaftway connecting the decks, the combination of an elevator operating in the shaftway and embodying a platform for delivering vehicles to and from the decks of the vessel; a track for the vehicles on the elevator platform comprising rails, the ends of which at each end of the platform are insulated from each other; tracks for the vehicles on the decks in line with the track on the elevator platform and comprising rails, the rails of each of the deck tracks having their ends adjoining the shaftway insulated from each other; a landing platform supported from the dock and extending over the vessel to the shaftway; a track on the landing platform in line with the track on the elevator platform and comprising rails the ends of which adjoining the shaftway are insulated from each other; hoisting mechanism above the shaftway; apparatus on the elevator and apparatus on the landing platform for controlling the hoisting mechanism; an electric safety circuit connected with the insulated rail ends of the said tracks; and means operable by the safety circuit to prevent operation of the hoisting mechanism when the adjacent insulated rail ends of any one of said tracks are electrically bridged.

14. In an arrangement for loading and unloading vessels including a dock, and a vessel berthed in the dock and comprising a plurality of decks and a shaftway connecting the decks, the combination of an elevator operating in the shaftway and embodying a platform for delivering vehicles to and from the decks of the vessel; a track for the vehicles on the elevator platform comprising rails, the ends of which at each end of the platform are insulated from each other; tracks for the vehicles on the decks in line with the track on the elevator platform and comprising rails, the rails of each of the deck tracks having their ends adjoining the shaftway insulated from each other; a landing platform supported from the dock and extending over the vessel to the shaftway; a track on the landing platform in line with the track on the elevator platform and comprising rails the ends of which adjoining the shaftway are insulated from each other; hoisting mechanism above the shaftway; apparatus on the elevator and apparatus on the landing platform for controlling the hoisting mechanism; blocking means in each said control apparatus actuated on operative movement of either control apparatus to prevent operative movement of the other control apparatus; an electric safety circuit connected with said blocking means and with the insulated rail ends of said tracks operable to actuate said blocking means when the adjacent insulated rail ends of any one of said tracks are electrically bridged.

DELAVAN MUNSON BALDWIN.